United States Patent Office 3,378,133
Patented Apr. 16, 1968

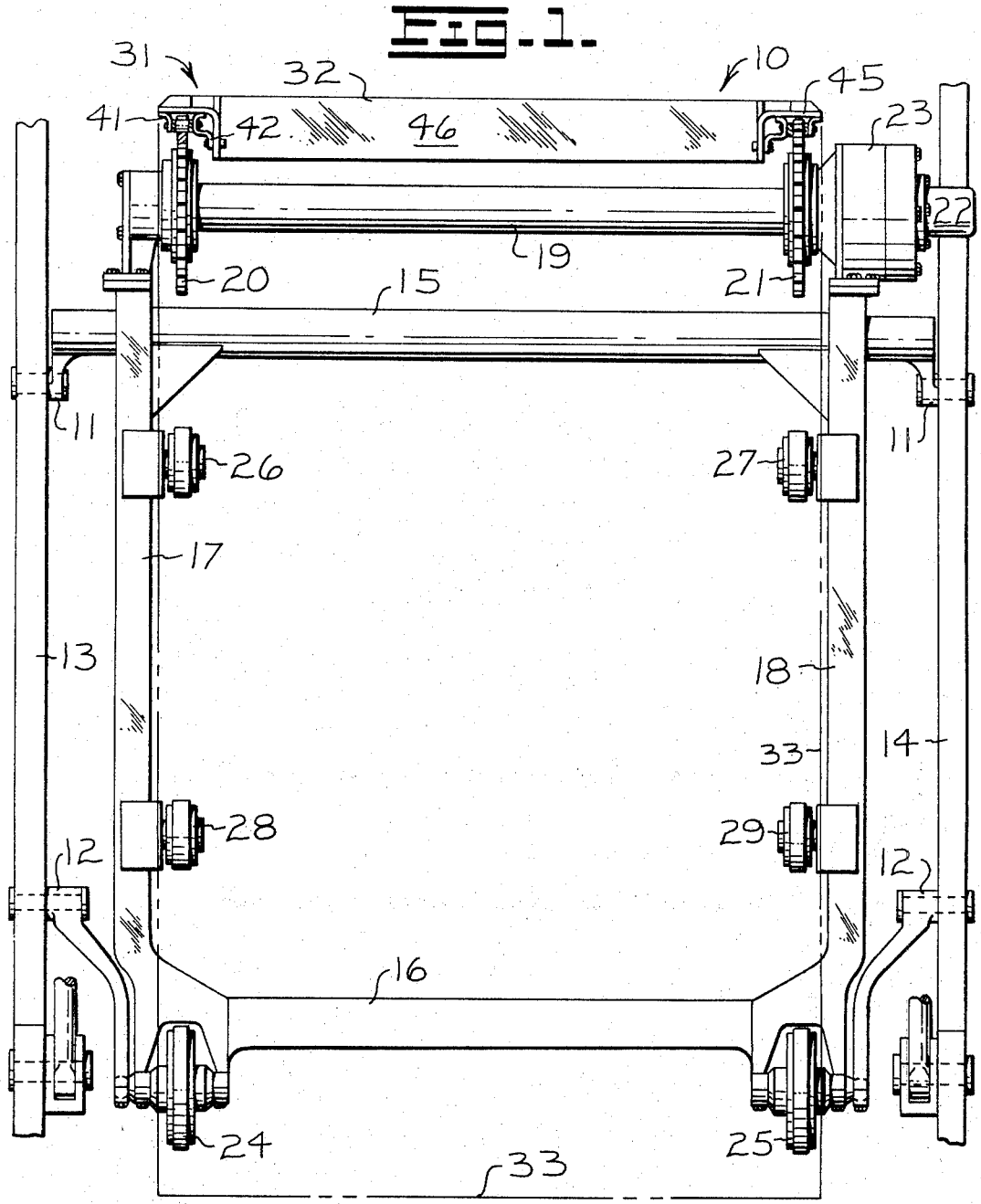

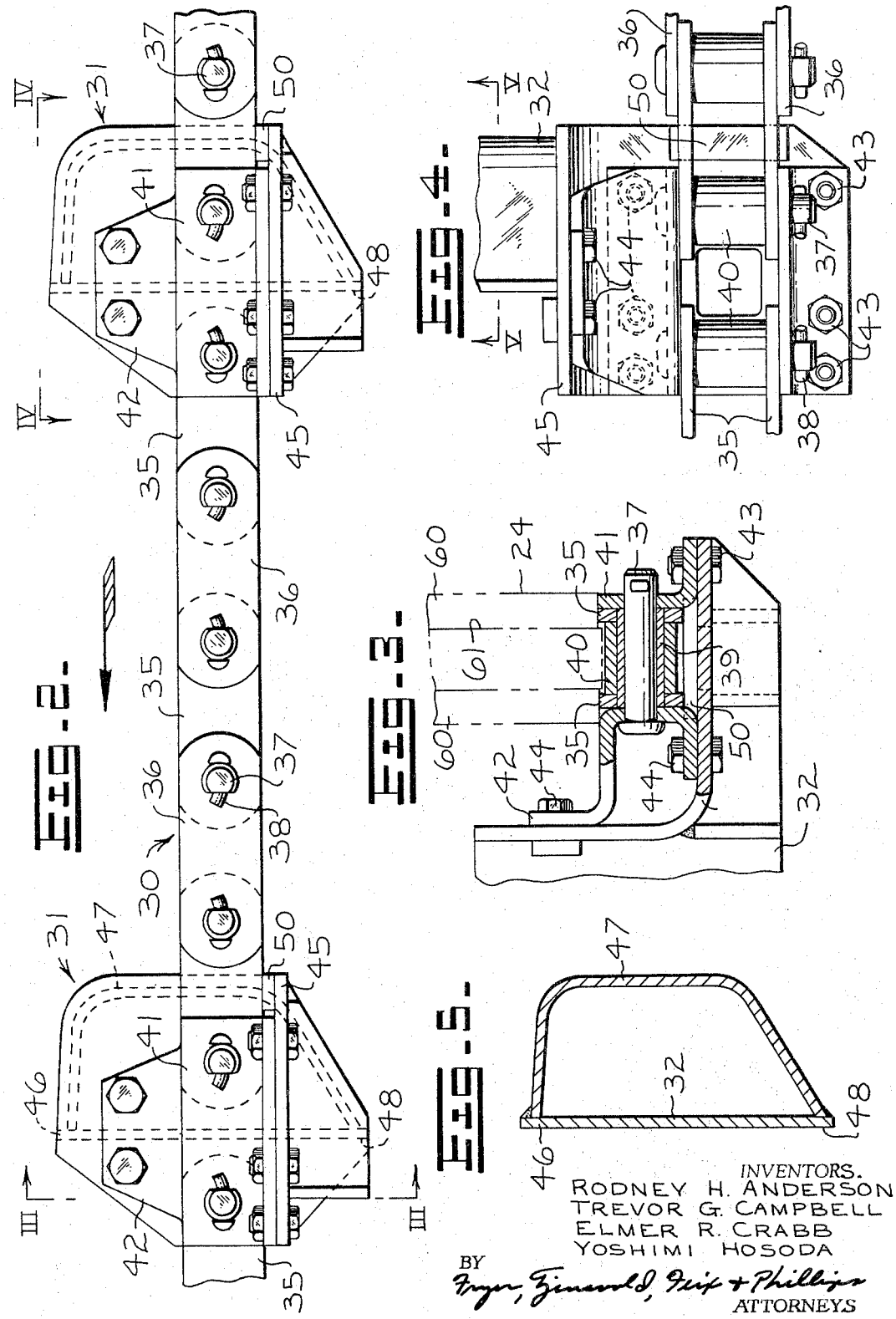

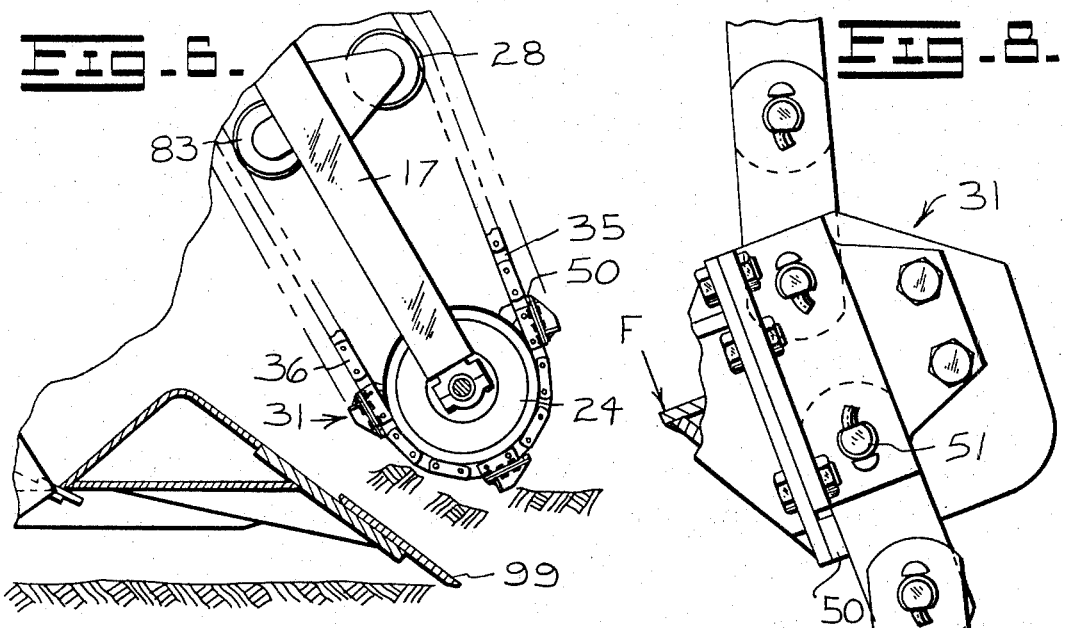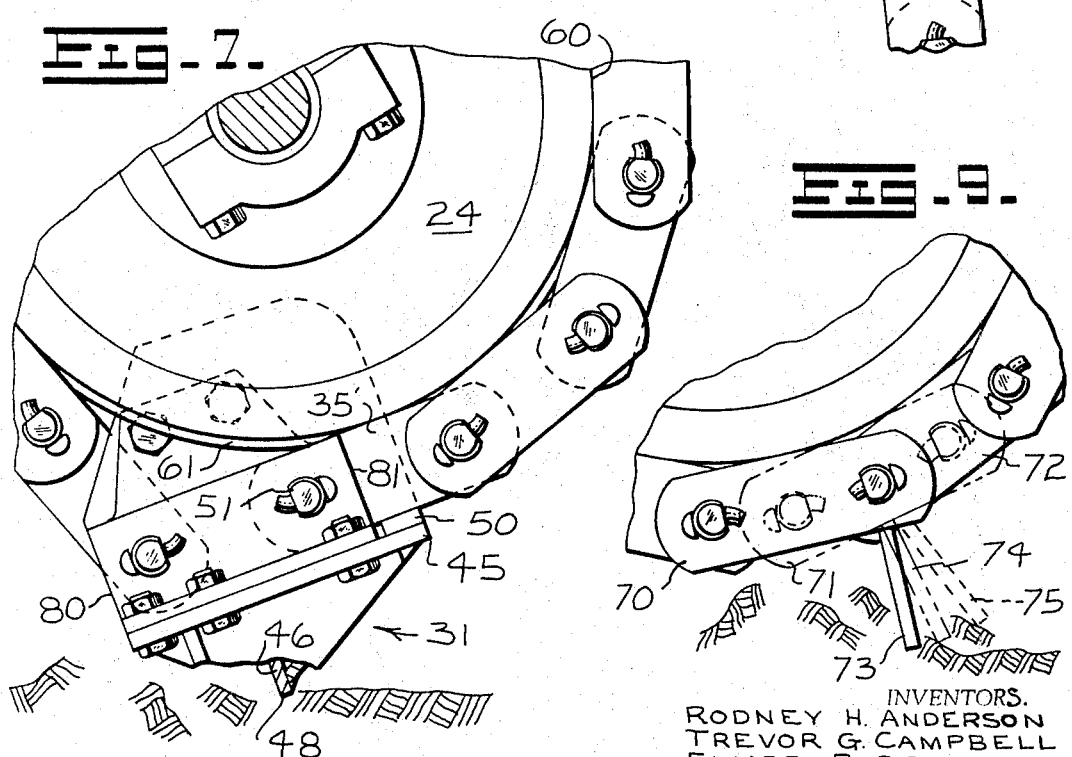

3,378,133
CHAIN AND FLIGHT ASSEMBLY FOR
SELF-LOADING SCRAPERS
Rodney H. Anderson and Trevor G. Campbell, Peoria,
Elmer R. Crabb, Morton, and Yoshimi Hosoda, Peoria,
Ill., assignors to Caterpillar Tractor Co., Peoria, Ill.,
a corporation of California
Filed Sept. 28, 1966, Ser. No. 582,619
4 Claims. (Cl. 198—175)

ABSTRACT OF THE DISCLOSURE

Flight members are attached to a pair of driven chains at spaced apart locations therealong by means of mounting brackets each consisting of an L-shaped element and a ladle shaped element bolted to a base plate integral with each flight member such that substantially equal portions of each flight member are disposed on opposite sides of the center line of each chain, such that the face plate of each flight member is disposed substantially midway the length of each mounting bracket, and such that a support strip is disposed at the trailing end of each base plate to prevent kinking of the chains. Opposition to chain kinking is accomplished by a facsimile of a lever acting upon the support strip and formed in part by the combination of the L-shaped element and the ladle shaped element and the side bars of the chain trailing the mounting bracket.

The present invention relates to an improved construction of a chain and flight assembly for use in the elevator mechanism of a self-loading scraper.

Prior to the present invention, the manufacturers of self-loading scrapers were continually beset with premature wear, leading to the need for early replacement of the elevator flight chain. Several factors contributed to the chain's having an uneconomically short life.

Kinking of the elevator chain subjected the chain rollers and pins to abnormally high and damaging rates of wear. Attrition of the chain rollers also resulted from harmful sliding contact between the chain's rollers and the chain guides, idlers and frame support of the elevator mechanism. Improper flight contact with the soil caused irregular and abrupt interruptions in the normal rotation of the chain and flight assembly during the loading cycle thereby subjecting the chain to harmful shock stresses and to kinking. Premature wear of the chain in turn led to improper operation of the flight assembly.

Accordingly, it is an object of the present invention to provide an improved chain and flight assembly capable of satisfactory operation for a reasonably extended and economic period of time.

It is also an object of the invention to provide an improved chain and flight assembly having a unique combination of flight member support brackets which allow for the use of a flight member having greater material handling capacity.

It is also an object of the present invention to provide an improved chain and flight assembly wherein the transverse center line of each flight member is approximately within a plane which is both normal to the side bars of the chain and through the chain's center line.

It is also an object of the present invention to provide an improved chain and flight assembly wherein the outermost ground engaging strike area of each flight member is relatively close to the center line of the chain so as to minimize kinking.

It is yet another object of the present invention to provide means on the flight member support bracket to distribute and resist any potential kink-producing torsional moment over a facsimile of a lever comprised by at least two links trailing the flight member support.

It is yet another object of the present invention to provide an improved chain and flight assembly wherein the side bars of the chain are of such a width as not to allow the chain rollers to ride on the chain idler.

It is still another object of the present invention to provide an improved chain and flight assembly wherein the face plates of each flight member "knifes" into the broken material adjacent the cutting edge of the self-loading scraper.

It is yet another object of the present invention to provide chain carrier rollers on the dirt side of the conveyor frame which prevent the chain and flight assembly from striking the underside of the frame thereby preventing damaging rates of wear to itself and to the frame, which eliminates needless flexure of the chain, and which materially reduces potential kinking of the chain.

More specific objects and advantages of the present invention will become apparent from the following description and drawings, wherein:

FIG. 1 is a front elevation of an elevator mechanism of a self-loading scraper with parts excluded for ease of reference;

FIG. 2 is a side elevation of a portion of the chain and flight assembly of the present invention;

FIG. 3 is a front elevation, partly in section, taken along the lines III—III of FIG. 2;

FIG. 4 is a plan view taken along lines IV—IV of FIG. 2;

FIG. 5 is a cross-sectional view of a flight member taken along the lines V—V of FIG. 4;

FIG. 6 is a schematic of the lower end of the elevator mechanism adjacent the cutting edge, shown in cross-section, of a self-loading scraper;

FIG. 7 is a fragmentary portion of the lower idler nd of the chain and flight assembly of FIG. 6, with parts broken away and in cross section;

FIG. 8 is a side elevation of a fragmentary portion of the chain and flight assembly of the present invention with parts broken away and in cross section; and FIG. 9 is a fragmentary schematic portion of the lower idler and chain and flight assembly of the present invention.

Referring to FIG. 1, a conveyor 10 is pivotally mounted as at 11 and 12 to the side walls 13 and 14 of the bowl of a self-loading scraper. Spreader tubes 15 and 16 rigidly connect side rails 17 and 18 which rotatably support shaft 19 carrying chain drive sprockets 20 and 21. Cooperating with the two drive sprockets, and with lower idlers 24 and 25, and carrier rollers 26, 27, 28 and 29, are two chains 30 (see FIG. 2) which together with a series of transverse flight members 32, form the conveyor. For the purpose of clarity neither of the two chains 30 are shown in FIG. 1. Furthermore only one flight assembly 31 is shown in FIG. 1 but the locus of the path formed by the extremities of the series of flight assemblies as they are caused to be driven is defined by phantom line 33. The shaft and drive sprockets are powered to rotate the chains and flights clockwise as viewed in FIG. 6 by a hydraulic motor 22 and a gear reduction mechanism 23 (see FIG. 1) so as to urge the dirt upwardly and rearwardly into the bowl.

Referring to FIGS. 2, 3 and 4, a portion of one chain 30 is illustrated and comprises two parallel series of inner and outer overlapping side bars 35 and 36 respectively pivotally connected by chain pins 37 and locked by cotter pins 38. Each pin carries a roller bushing 39, press-fitted into each inner side bar 35, and a concentric chain roller 40.

Replacing each third successive outer side bar 36 along the length of the chain is a combination of an L-shaped bracket 41 and a ladle-shaped bracket 42 which are bolted as at 43 and 44 respectively to a base plate 45 forming part of flight member 32 of each flight assembly.

A feature of the present invention is the increased support the two brackets 41 and 42 and the base plate 45 give to each flight member. This increased support is particularly important because of the current use of flight members having large material handling capacity as noted hereinafter.

Referring to FIG. 5, each flight member 32 consists of a face plate 46 welded for support to a U-shaped backing member 47. Face plate 46 and member 47 are fixedly secured to base plate 45 such that approximately equal portions of face plate 46 are on either side of the center line of the chain. This allows the height of face plate 46 to be relatively large, hence increases the work capacity of each flight assembly 31. This construction also brings the outermost strike area 48 of each face plate 46 closer to the center line of the chain thereby both reducing the attendant torsional moment and lessening the effect of any shock stress during loading operations. This featured construction also materially reduces the deleterious effect of friction wear of interior and exterior portions of the chain rollers 40.

Another feature of the present invention resides in the use of a support strip 50 at the trailing end of base plate 45. Referring to FIGS. 6 and 7, as the outermost strike area 48 of each flight member 32 contacts the broken earth adjacent cutting edge 99 and urges it rearwardly and upwardly, the torsional moment described above tends to cause counterclockwise rotation of the chain flight assembly about pin 51. Without the presence of support strip 50, the flight assembly 31 and supporting brackets 41 and 42 would tend to kink thereby subjecting the chain roller associated with pin 51 to extreme stress and wear and to early failure. By employing the support strip 50, the flight assembly and brackets are substantially precluded from kinking, thereby both reducing the tension and angular rotation of the chain and materially reducing the internal and external wear rate of the chain. Specifically the internal wear rate is reduced because this torsional moment about pin 51 is effectively opposed by a facsimile of a lever formed by the combination of the flight brackets and immediate trailing link formed in part by the members 41 and 42 and inner side bars 35'.

It will be understood that the same beneficial result will occur from the use of support strip 50 when the flights contact material already loaded in the bowl. In FIG. 8 force F represents the force caused by contact with material already in the bowl tending to kink the chain. The support strip tends to limit the tendency for kinking and reduces the shock stress which would otherwise occur in pin 51 and the chain roller and bushing associated therewith.

Another feature of the present invention which materially reduces deleterious attrition of the chain rollers 40 can best be seen by referring to FIGS. 3 and 7. The surface 60 of lower idler 24 has a chain retaining flange projection 61. The width of inner side bars 35 and outer side bars 36 is such that the inner edges of the side bars ride on surface 60 but such that there is no contact between the chain roller 40 and the flange projection 61.

Yet another feature of the present invention concerns the proper location of face plate 46 relative to the leading and trailing edge of the flight support member. This is best described by referring to the schematic of FIG. 9. For ease of understanding the principle involved, links 70, 71 (in phantom lines) and 72 illustratively represent the L-shaped bracket 41, ladle-shaped bracket 42, base plate 45 and the accompanying support structure for each flight. Each link 70, 71 and 72 has a facsimile of face plate 46 represented by members 73, 74 and 75. Theoretical soil studies show that optimum performance of the conveyor occurs when each flight engages the earth so as to "knife" into it and that deleterious chain wear and shock occurs when the flight "slaps" the earth. Member 73 attached to the rear portion of link 70 "knifes" into the earth. Member 75 attached to the forward portion of link 72 "slaps" the earth. Member 74 attached to the middle portion of link 71 represents a compromise between these two extreme cases. While in theory the rearward location of face 73 is best adapted to "knife" into the earth, it is not practical because the flight member could not be adequately supported. Consequently the median positioning of face plate 46 with respect to ends 80 and 81 (see FIG. 7) of L-shaped bracket 41 is employed.

Referring now to FIGS. 1 and 6 for another feature of the present invention, a chain carrier roller 83 is secured to the dirt side of side rail 17 substantially opposite carrier roller 28 and below the center line of bottom idler 24. A chain carrier roller (not shown) identical with that of roller 83 is similarly located on the dirt side of the side rail 18. Experimental studies made without the presence of dirt side carrier rollers 83 revealed that, as the soil was being loaded into the scraper bowl, forces were generated which tended to cause the flight chains and flight members to wrap around lower idlers 24 and 25 thereby causing them to strike the underside or dirt side of the side railings and frame generally with sudden and damaging intensity. This striking action caused wear of the chain and flight assembly as well as of the side railings and frame generally. Not only has the introduction of these dirt side rollers 83 eliminated this striking action, and its attendant wear, but also their introduction has constrained the chain to travel in line and the flight members to remain substantially normal to the direction of travel thereby further ensuring a more efficient operation of the conveyor.

Moreover, the dirt side rollers 83, in combination with other features of the present invention, further reduces any tendency the chains might have to kink. While the present embodiment describes the use of a single pair of dirt side rollers 83, it is understood that two or more pairs could be employed.

Since these dirt side rollers rotate to provide substantially frictionless contact with the elevator chain, the wear rate of the flight chain is further reduced.

We claim:

1. In a chain and flight assembly consisting of a plurality of flight members and a plurality of chains, at least one flight member extending between the chains and being pivotally associated through link pins with a plurality of chain links, the improvement comprising: first means for securing a flight member to a chain such that substantially equal portions of the flight member are disposed on opposite sides of the center line of the chain; kink resisting means disposed at the trailing end of said first means for contact with the portion of the chain beyond the pivotal connection of the flight member to prevent kinking thereof; and wherein each flight member includes a face plate and wherein said face plate is disposed substantially midway the length of said first means.

2. The invention as set forth in claim 1 wherein said first means includes a first bracket in the shape of an L, a second bracket in the shape of a ladle, and a base plate which is integral with the flight member and to which each first and second bracket is fixedly secured, the first bracket being secured to the base, and the second bracket being secured above and below the center line of the chain to the flight member and to the base plate, respectively, and wherein a link pin pivotally mounts the chain to said first and second brackets.

3. The invention as set forth in claim 1 wherein the kink resisting means comprises a support strip fixedly secured at the trailing end of said base plate in confronting relationship with the bottoms of the trailing chain links pivotally connected to said first means.

4. In a chain and flight assembly consisting of a plurality of flight members pivotally associated through link pins with a plurality of chain links, the improvement comprising: first means for securing a flight member to a chain such that substantially equal portions of the flight member are disposed on opposite sides of the center line of the chain; kink resisting means disposed at the trailing end of said first means for contact with the portion of the chain immediately trailing the first means to prevent kinking thereof; and wherein each flight member includes a face plate and wherein said face plate is disposed substantially midway the length of said first means; said first means including a first bracket in the shape of an L, a second bracket in the shape of a ladle, and a base plate which is integral with the flight member into which each first and second bracket is fixedly secured, the first bracket being secured to the base, and the second bracket being secured above and below the center line of the chain to the flight member and to the base plate, respectively, and wherein a link pin pivotally mounts the chain to the said first and second brackets.

References Cited

UNITED STATES PATENTS

| | | | |
|---|---|---|---|
| 1,550,365 | 8/1925 | Jones | 198—11 X |
| 1,683,653 | 9/1928 | Brown | 198—168 |
| 2,307,139 | 1/1943 | Kurtz | 198—175 |
| 2,515,080 | 7/1950 | Dalrymple | 198—195 |
| 2,546,512 | 3/1951 | Lewis | 198—11 X |
| 2,666,404 | 1/1954 | Kessler | 198—195 |
| 2,846,053 | 8/1958 | Hyman | 198—175 |
| 1,174,965 | 3/1916 | Brown | 198—176 X |
| 2,509,529 | 5/1950 | Roblee | 198—172 |

RICHARD E. AEGERTER, *Primary Examiner.*

EVON C. BLUNK, GERALD M. FORLENZA,
*Examiners.*

R. J. HICKEY, *Assistant Examiner.*